(12) United States Patent
Chandrasekar et al.

(10) Patent No.: US 10,690,778 B2
(45) Date of Patent: Jun. 23, 2020

(54) VALIDATION OF TIME ASSISTANCE DATA TO REDUCE SATELLITE POSITIONING DEGRADATION

(71) Applicant: QUALCOMM Incorporated, San Diego, CA (US)

(72) Inventors: Harisrinivas Chandrasekar, San Diego, CA (US); Prabhu Kandasamy, San Diego, CA (US); Naveen Kumar V. Bonda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 15/706,501

(22) Filed: Sep. 15, 2017

(65) Prior Publication Data

US 2019/0086555 A1 Mar. 21, 2019

(51) Int. Cl.
*G01S 19/25* (2010.01)
*G01S 19/09* (2010.01)
*H04L 12/18* (2006.01)
*H04W 4/02* (2018.01)

(52) U.S. Cl.
CPC ............ *G01S 19/256* (2013.01); *G01S 19/09* (2013.01); *H04L 12/18* (2013.01); *H04W 4/02* (2013.01); *G01S 19/258* (2013.01); *G01S 2205/008* (2013.01); *H04L 2209/80* (2013.01)

(58) Field of Classification Search
CPC ........ G01S 19/09; G01S 19/20; G01S 19/256; G01S 19/258; G01S 2205/008; H04L 12/18; H04W 4/02
USPC .................................................. 342/357.42
See application file for complete search history.

(56) References Cited

U.S. PATENT DOCUMENTS

| 7,009,948 B1 | 3/2006 | Carlsson et al. |
| 2009/0315768 A1 | 12/2009 | Abraham |
| 2011/0205110 A1 | 8/2011 | Abraham et al. |
| 2012/0306691 A1 | 12/2012 | Werner |
| 2013/0252630 A1 | 9/2013 | Edge et al. |

FOREIGN PATENT DOCUMENTS

| EP | 1546754 A1 | 6/2005 |
| WO | 04097445 | 11/2004 |

OTHER PUBLICATIONS

CSR: "Clarification of Network Time Validity in GNSS Assistance", 3GPP Draft; R2-100048, 3rd Generation Partnership Project (3GPP), Mobile Competence Centre; 650, Route Des Lucioles; F-06921 Sophia-Antipolis Cedex; France, vol. RAN WG2, No. Valencia, Spain; Jan. 18, 2010, Jan. 11, 2010 (Jan. 11, 2010), 4 Pages, XP050420804, [retrieved on 2810-01-11] the whole document.
International Search Report and Written Opinion—PCT/US2018/048244—ISA/EPO—Nov. 30, 2018.

*Primary Examiner* — Dao L Phan
(74) *Attorney, Agent, or Firm* — Muncy, Geissler, Olds & Lowe, P.C.

(57) ABSTRACT

A method for validating time assistance data includes receiving, at a mobile device, the time assistance data via a first wireless communication technology from a serving cell. The method also includes obtaining a reference global navigation satellite system (GNSS) time, at the mobile device, via a second wireless communication technology and determining whether the time assistance data is valid based on the reference GNSS time. Further included in the method is determining a validated GNSS time based on the time assistance data in response to determining that the time assistance data is valid.

28 Claims, 5 Drawing Sheets

VALIDATION OF TIME ASSISTANCE DATA TO REDUCE SATELLITE POSITIONING DEGRADATION

FIELD OF DISCLOSURE

This disclosure relates generally to wireless communications, and in particular, but not exclusively, relates to the validation of signal acquisition time assistance data to reduce satellite positioning degradation for a mobile device.

BACKGROUND

One disadvantage of satellite positioning systems (SPS) for location determination is the relatively long time needed to perform signal acquisition. Satellite vehicle (SV) signals cannot be tracked until they have first been located by searching in a two-dimensional search "space", whose dimensions are code-phase delay and Doppler frequency shift. Typically, if there is no prior knowledge of a signal's location within this search space, as would be the case after a receiver "cold start", a large number of code delays (e.g., ~2000) and Doppler frequencies (e.g., ~15) must be searched for each SV signal that is to be acquired and tracked. Thus, for each signal, up to 30,000 locations in the search space must be examined. Typically these locations are examined sequentially, one at a time, a process that can take as long as 5 to 10 minutes. The acquisition time is further lengthened if the identities (i.e., PN-codes) of the four satellites within view of the receiving antenna are unknown.

Signal acquisition is needed at least when an SPS receiver has lost the signals, which may occur, for example, after power down, or when the signal has been blocked from the receiver for some period of time. After acquiring the signals, they may be maintained or "tracked."

Many devices such as mobile devices possess SPS functionality as an additional feature or enhancement, rather than as a primary purpose of the device. For these devices, a need to continuously track SPS SV signals would increase the cost, decrease the battery life, or reduce the functionality of the primary device (e.g., primarily functioning as a cell phone). For example, because SPS SV signals are provided at frequencies that differ from cellular telephone signal frequencies, a single receiver cannot simultaneously monitor both frequencies. In order to do so, a mobile device would need an additional receiver unit, thereby adding to the cost of the device. Moreover, the processing capability of the system would need to be increased in order to concurrently monitor both signals, which would increase both cost and power consumption. Accordingly, many such systems rarely track SPS SV signals, but rather acquire the needed signals only upon demand.

Typically, SPS-capable systems require acquisition of SPS SV signals. Some systems only occasionally require such acquisition, while others require acquisition of the SPS SV signals each time they are needed for a SPS function. The need for signal acquisition, unfortunately, does not prevent SPS functions from being needed urgently, such as when a mobile device location is required quickly to facilitate response to an emergency. In such situations, the time delay associated with a 5 to 10 minute SPS satellite signal acquisition cold-start by a SPS/wireless terminal unit before a position determination can be obtained is highly undesirable.

In order to reduce this delay, information may be provided to aid a receiver in acquiring a particular signal. Such acquisition assistance information permits a receiver to narrow the space that must be searched in order to locate a signal. The acquisition assistance information (i.e., time assistance data), in one aspect, may include the SPS time (e.g., GPS time) or UTC time, which may provide information related to the subframe boundary associated with the SPS signals. Acquisition assistance information may also include other information about the signal, such as its PN (pseudo-noise or pseudo-random) code, frequency, modulation, and content. The provided acquisition assistance information may allow the mobile device to acquire the signal quicker. In addition to shortening the delay before a location determination can be produced, the acquisition assistance information also reduces the processing burden on the receiver, which may reduce power consumption. Systems in which receivers locate ranging signals for position location (such as GPS signals) upon demand, with the assistance of information provided from another source within the system, are generally referred to as "wireless assisted position location" systems.

In a Code-Division Multiple Access (CDMA) network, the system time for CDMA is always in-sync with GPS time. Thus, acquisition assistance information, such as GPS time may be derived directly from the CDMA system time. In a Long Term Evolution (LTE) network, system information that includes a GPS time and/or UTC time may be broadcast by an eNB by way of one or more system information blocks (SIBs), such as SIB8 and/or SIB16. However, due to an incorrect configuration by the carrier and/or due to a rogue eNB, the acquisition assistance information (e.g., the GPS time) may be invalid. A mobile device receiving and utilizing invalid time assistance data may result in a significant increase in a time to first fix (TTFF) and/or a significant increase in power consumption when the mobile device is attempting to acquire an SPS signal.

SUMMARY

The following presents a simplified summary relating to one or more aspects and/or embodiments associated with the mechanisms disclosed herein for validating LTE base station time assistance data for a satellite positioning system (SPS). As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary presents certain concepts relating to one or more aspects and/or embodiments relating to the mechanisms disclosed herein to validate LTE base station time assistance data in a simplified form to precede the detailed description presented below.

According to one aspect, a method for validating time assistance data includes receiving, at a mobile device, the time assistance data via a first wireless communication technology from a serving cell. The method also includes obtaining a reference global navigation satellite system (GNSS) time, at the mobile device, via a second wireless communication technology and determining whether the time assistance data is valid based on the reference GNSS time. Further included in the method is determining a validated GNSS time based on the time assistance data in response to determining that the time assistance data is valid.

According to another aspect, a mobile device includes a first transceiver, a second transceiver, at least one processor, and at least one memory coupled to the at least one processor. The first transceiver configured to communicate via a first wireless communication technology and the second transceiver is configured to communicate via a second wireless communication technology. The at least one processor and the at least one memory are configured to direct the mobile device to: (i) receive, at the first transceiver, time assistance data from a serving cell via the first wireless communication technology; (ii) obtain a reference global navigation satellite system (GNSS) time, at the second transceiver, via the second wireless communication technology; (iii) determine whether the time assistance data is valid based on the reference GNSS time; and (iv) determine a validated GNSS time based on the time assistance data in response to determining that the time assistance data is valid.

According to yet another aspect, a mobile device, includes means for receiving, at the mobile device, time assistance data via a first wireless communication technology from a serving cell. The mobile device also includes means for obtaining a reference global navigation satellite system (GNSS) time, at the mobile device, via a second wireless communication technology. Further included in the mobile device are a means for determining whether the time assistance data is valid based on the reference GNSS time, and a means for determining a validated GNSS time based on the time assistance data in response to determining that the time assistance data is valid.

According to another aspect, a non-transitory computer-readable medium includes program code stored thereon. Executing the program code on one or more processors of a mobile device causes the one or more processors to direct the mobile device to: (i) receive, at the mobile device, time assistance data from a serving cell via a first wireless communication technology; (ii) obtain a reference global navigation satellite system (GNSS) time, at the mobile device, via a second wireless communication technology; (iii) determine whether the time assistance data is valid based on the reference GNSS time; and (iv) determine a validated GNSS time based on the time assistance data in response to determining that the time assistance data is valid.

Other objects and advantages associated with the mechanisms disclosed herein to validate LTE time assistance data described herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
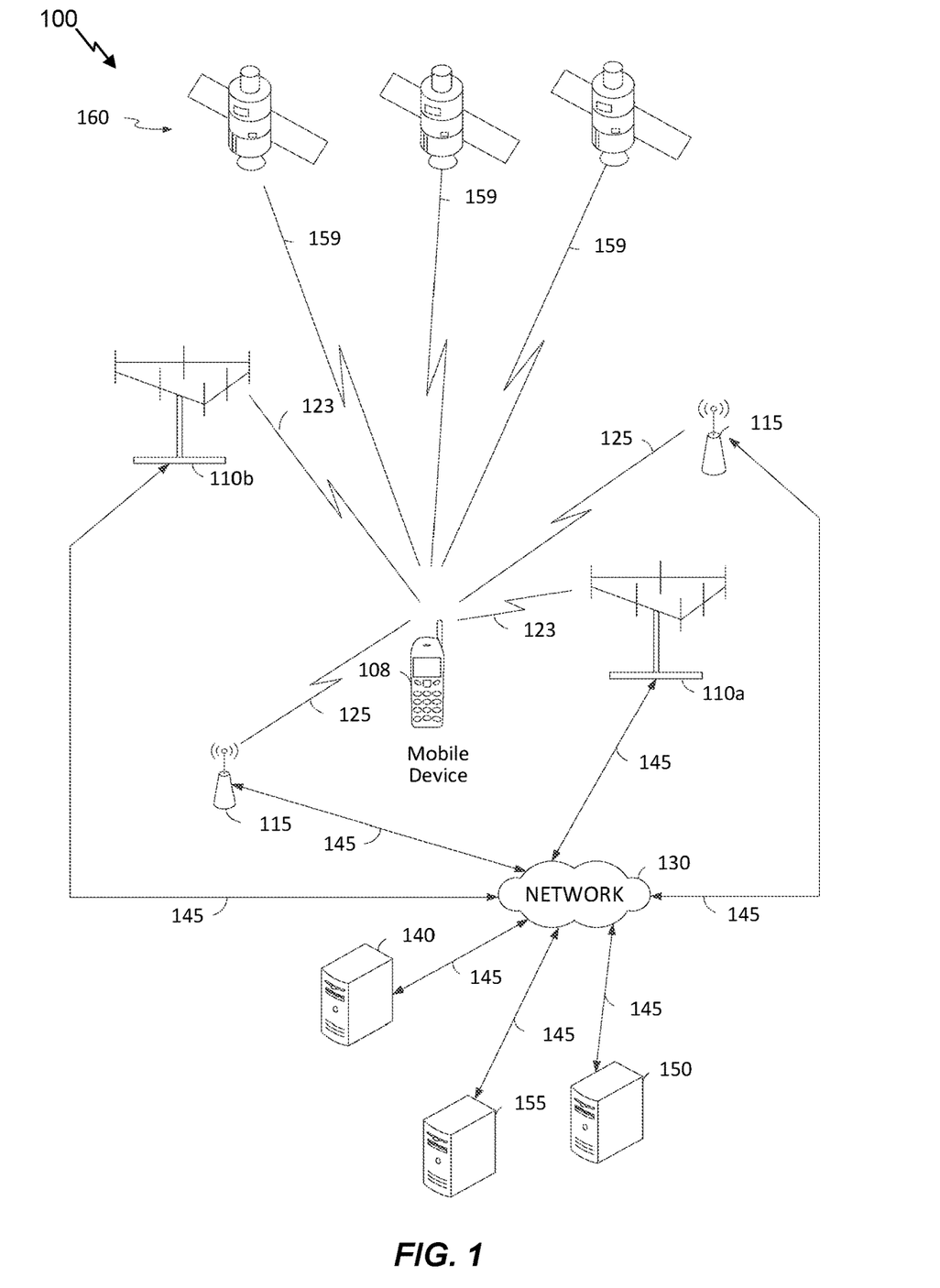
FIG. 1 illustrates an example operating environment for a mobile device that can validate time assistance data, according to one aspect of the disclosure.

According to one aspect of the disclosure, FIG. 1 illustrates an exemplary operating environment 100 for a mobile device 108 that can determine its position and/or location within the operating environment 100. In certain implementations, as shown in FIG. 1, mobile device 108 may receive or acquire satellite positioning system (SPS) signals 159 from SPS satellites 160. In some examples, SPS satellites 160 may be from one global navigation satellite system (GNSS), such as the GPS or Galileo satellite systems. In other examples, the SPS Satellites may be from multiple GNSS such as, but not limited to, GPS, Galileo, Glonass, or Beidou (Compass) satellite systems. In other examples, SPS satellites may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In addition, the mobile device 108 may transmit radio signals to, and receive radio signals from, a wireless communication network. In one example, mobile device 108 may communicate with a cellular communication network by transmitting wireless signals to, or receiving wireless signals from, a base station transceiver 110a over a wireless communication link 123. Similarly, mobile device 108 may transmit wireless signals to, or receive wireless signals from a local transceiver 115 over a wireless communication link 125.

In some implementations, local transceiver 115 may be configured to communicate with mobile device 108 at a shorter range over wireless communication link 125 than at a range enabled by base station transceiver 110a over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on link 125 according to a cellular communication protocol. Of course it should be understood that these are merely examples of networks that may communicate with a mobile device over a wireless link, and claimed subject matter is not limited in this respect.

In some implementations, base station transceivers 110a and 110b, as well as local transceiver 115 may communicate with servers 140, 150 and 155 over a network 130 through links 145. Here, network 130 may comprise any combination of wired or wireless links. In a particular implementation, network 130 may comprise Internet Protocol (IP) infrastructure capable of facilitating communication between mobile device 108 and servers 140, 150 or 155 through local transceiver 115 or base station transceiver 150. In another implementation, network 130 may comprise cellular communication network infrastructure such as, for example, a base station controller or master switching center (not shown) to facilitate mobile cellular communication with mobile device 108.

In some implementations, and as discussed below, mobile device 108 may have circuitry and processing resources capable of computing a position fix or estimated location of mobile device 108. For example, mobile device 108 may compute a position fix based, at least in part, on pseudorange measurements to four or more SPS satellites 160. Here, mobile device 108 may compute such pseudorange measurements based, at least in part, on pseudonoise code phase detections in signals 159 acquired from four or more SPS satellites 160. In particular implementations, mobile device 108 may receive from base station transceiver 110a time assistance data to aid in the acquisition of signals 159 transmitted by SPS satellites 160 including, for example, almanac, ephemeris data, Doppler search windows, just to name a few examples.

For example, as shown in FIG. 1, mobile device 108, at its current illustrated position, may be served by base station transceiver 110a in the sense that the mobile device 108 may currently be configured to exchange data with the base station transceiver 110a (e.g., to place calls, access various services/networks, etc.). Thus, base station transceiver 110a may transmit data to mobile device 108 on a particular frequency (referred to as the serving cell frequency) and over a particular bandwidth (known as the serving cell bandwidth). Thus, in this example, from the perspective of mobile device 108, the base station transceiver 110a may be referred to as the serving cell. Other cells that may be geographically adjacent to or partially coincident with the serving cell may be referred to as neighboring cells. In this example, base station transceiver 110b and/or local transceiver 115 may be neighboring cells of base station transceiver 110a.

When receiving time assistance data from the base station transceiver 110a and/or 110b, these base station transceivers may take the form of a cell within a digital cellular network, and the mobile device 108 may include a cellular transceiver and processor that can receive the time assistance data to aid in acquiring the SPS signals 159. Such cellular networks may include, but are not limited to, standards in accordance with GSM, CMDA, 2G, 3G, 4G, LTE, etc. It should be understood that the digital cellular network may include additional base stations or other resources that may not be shown in FIG. 1. While base station transceivers 110a and 110b may actually be moveable or otherwise capable of being relocated, for illustration purposes it will be assumed that they are essentially arranged in a fixed position.

The mobile device 108 may perform position determination using known time-of-arrival (TOA) techniques such as, for example, Advanced Forward Link Trilateration (AFLT). As will be described in more detail below, in some aspects, the mobile device 108 may receive time assistance validation data from servers 140, 150, and 155 and/or transmit time assistance validation data to servers 140, 150, and 155 via network 130. Furthermore, various examples may have the mobile device 108 validate time assistance data received from base station transceivers 110a and 110b, which may have different types. For example, some base station transceivers 110a and/or 110b may be cellular base stations, and other base station transceivers 110a and/or 110b may be WiMAX base stations. In such an operating environment, the mobile device 108 may be able to receive data from each different type of base station transceiver 110a and 110b.

The position determination techniques described above may be used for various wireless communication networks such as a WWAN, a WLAN, a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of a WWAN, WLAN and/or WPAN.

As used herein, mobile device 108 may be a device such as a vehicle (manned or unmanned), a robot, a cellular or other wireless communication device, personal communication system (PCS) device, personal navigation device, Personal Information Manager (PIM), Personal Digital Assistant (PDA), laptop, tablet computer, or other suitable mobile device that is capable of receiving and/or communicating via two or more wireless communication technologies (e.g., GPS, LTE, CDMA, etc.). The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile platform."

Furthermore, in one embodiment, the mobile device 108 may be suitably linked to a vehicle through one or more communication interfaces (e.g., a Bluetooth interface, an RF antenna, a wired connection, etc.) that enable the mobile device 108 to read SPS measurements obtained by the vehicle, itself. Furthermore, an application program interface (API) that supports communication between the mobile device 108 and a vehicle may make the SPS measurements, obtained by the vehicle, available to the mobile device 108.

Figure 2:
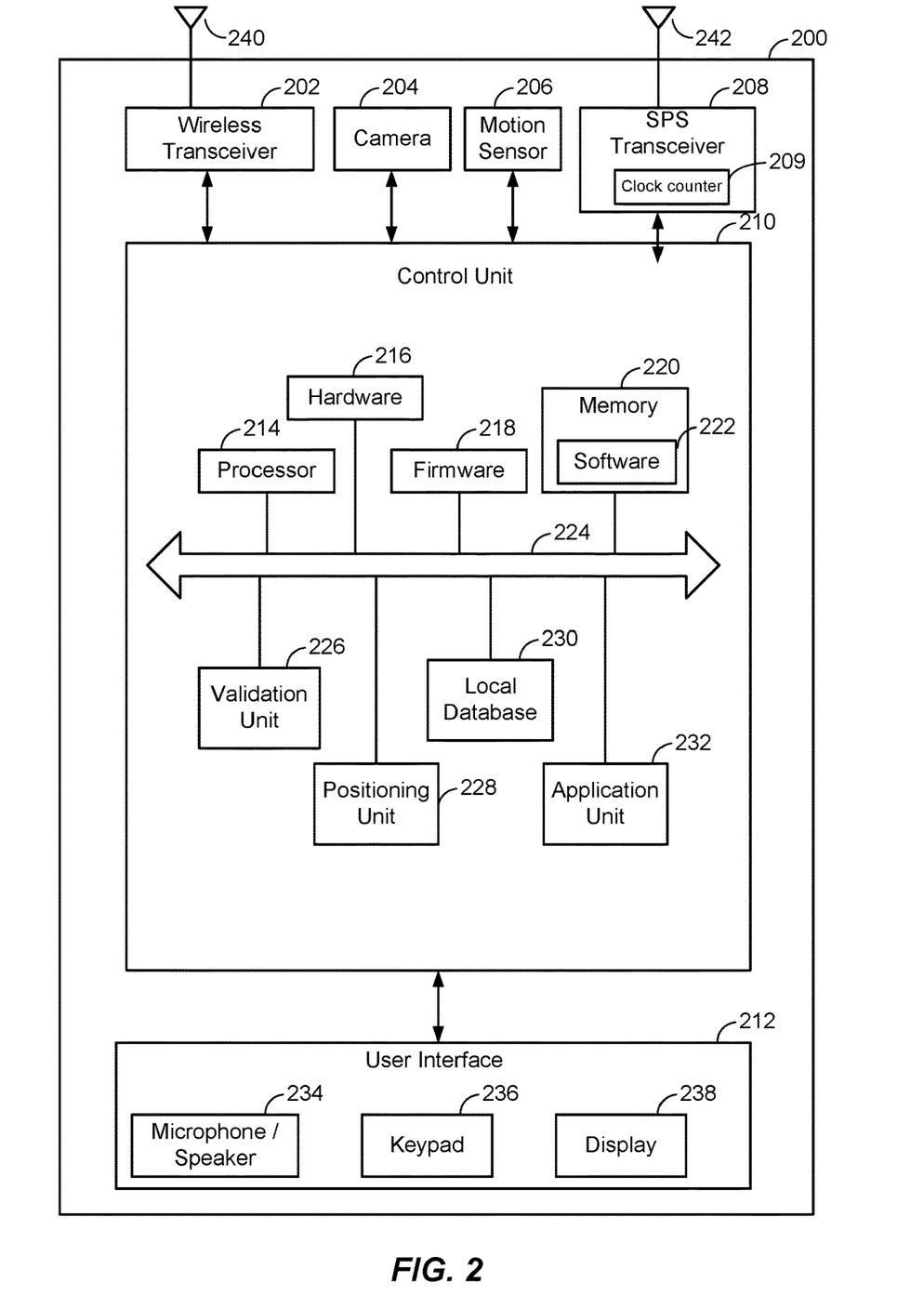
FIG. 2 illustrates an example mobile device that may be used in an operating environment that can validate time assistance data, according to one aspect of the disclosure.

FIG. 2 illustrates an example mobile device 200 that may be used in an operating environment 100 that can determine position using an SPS with the aid of time assistance data received from a serving cell, according to one aspect of the disclosure. Mobile device 200 is one possible implementation of mobile device 108 of FIG. 1.

The various features and functions illustrated in the diagram of FIG. 2 are connected together using a common data bus 224 which is meant to represent that these various features and functions are operatively coupled together. Those skilled in the art will recognize that other connections, mechanisms, features, functions, or the like, may be provided and adapted as necessary to operatively couple and configure an actual portable device. Further, it is also recognized that one or more of the features or functions illustrated in the example of FIG. 2 may be further subdivided or two or more of the features or functions illustrated in FIG. 2 may be combined.

The mobile device 200 may include one or more wireless transceivers 202 that may be connected to one or more antennas 240. The wireless transceiver 202 may include suitable devices, hardware, and/or software for communicating with and/or detecting signals to/from base station transceivers 110a, 110b, local transceiver 115, and/or directly with other wireless devices within a network. For example, the wireless transceiver 202 may comprise a CDMA communication system suitable for communicating with a CDMA network of wireless base stations; however in other aspects, the wireless communication system may comprise another type of cellular telephony network, such as, for example, TDMA, OFDMA or GSM. Additionally, any other type of wide area wireless networking technologies may be used, for example, WiMAX (IEEE 802.16), etc. The wireless transceiver 202 may also include one or more local area network (LAN) transceivers that may be connected to one or more antennas 240. For example, the wireless transceiver 202 may include suitable devices, hardware, and/or software for communicating with and/or detecting signals to/from base station transceivers 110a, 110b, and/or directly with other wireless devices within a network. In one aspect, the wireless transceiver 202 may include a Wi-Fi (802.11x) communication system suitable for communicating with one or more wireless access points; however in other aspects, the wireless transceiver 202 may comprise another type of local area network, personal area network, (e.g., Bluetooth). Additionally, any other type of wireless networking technologies may be used, for example, Ultra Wide Band, ZigBee, wireless USB, etc.

In some aspects, mobile device 200 is configured to exploit signals from a plurality of base station transceivers 110a, 110b, a plurality of local transceivers 115, or any combination of the two. The specific type of base station and/or local transceiver being utilized by the mobile device 200 may depend upon the environment of operation. Moreover, the mobile device 200 may dynamically select between the various types of base station and/or local transceivers in order to arrive at an accurate position solution. In other examples, various network elements may operate in a peer-to-peer manner, whereby, for example, the mobile device 200 may be replaced with a base station and/or local transceiver, or vice versa. Other peer-to-peer embodiments may include another mobile platform (not shown) acting in place of one or more base station and/or local transceiver.

As shown in FIG. 2, mobile device 200 may optionally include a camera 204. Camera 204 may be a single monocular camera, a stereo camera, and/or an omnidirectional camera. In one aspect, camera 204 is calibrated such that the camera parameters (e.g., focal length, displacement of the optic center, radial distortion, tangential distortion, etc.) are known. Camera 204 is coupled to a control unit 210 to provide images to the control unit 210.

The illustrated example of mobile device 200 also includes an optional motion sensor 206. Motion sensor 206 may be coupled to control unit 210 to provide movement and/or orientation information which is independent of motion data derived from signals received by the wireless transceiver 202 and a Satellite Positioning System (SPS) transceiver 208.

The SPS transceiver 208 may also be included in the mobile device 200. The SPS transceiver 208 may be connected to one or more antennas 242 for receiving satellite signals. The SPS transceiver 208 may comprise any suitable hardware and/or software for acquiring, receiving, and processing SPS signals, such as a clock counter 209. The SPS transceiver 208 requests information and operations as appropriate from the other systems, and performs the calculations necessary to determine the position of mobile device 200 using measurements obtained by any suitable SPS algorithm. In one aspect, SPS transceiver 208 is coupled to control unit 210 to provide one or more SPS measurements to the control unit 210. In one example, the SPS measurements are range-rate measurements, such as GPS Doppler range-rate measurements. In another example, SPS transceiver 208 is configured to determine an SPS velocity of the mobile device 200 based on the range-rate measurements such that the SPS measurements are the SPS velocity measurements. In yet another example, the SPS measurements are the pseudorange measurements that are representative of a distance from the SPS transceiver 208 to a respective satellite (e.g., SPS satellites 159). That is, SPS measurements may include the range-rate measurements by themselves, the SPS velocity measurements by themselves, the pseudorange measurements themselves, and/or any combination of the three.

Mobile device 200 also includes a control unit 210 that is connected to and communicates with the wireless transceiver 202, the camera 204, the motion sensor 206, the SPS transceiver 208, and user interface 212, if present. In one aspect, the control unit 210 accepts and processes the SPS measurements received from SPS transceiver 208. Control unit 210 may be provided by a processor 214 and associated memory 220, hardware 216, firmware 218, and software 222.

The processor 214 may include one or more microprocessors, microcontrollers, and/or digital signal processors that provide processing functions, as well as other calculation and control functionality. The processor 214 may also include memory 220 for storing data and software instructions for executing programmed functionality within the mobile device 200. The memory 220 may be on-board the processor 214 (e.g., within the same IC package), and/or the memory may be external memory to the processor 214 and functionally coupled over a data bus 224. The functional details associated with aspects of the disclosure will be discussed in more detail below.

Control unit 210 may further include a validation unit 226, a positioning unit 228, a local database 230, and an application unit 232. The validation unit 226 may be configured to determine whether time assistance data received from a serving cell is valid. The positioning unit 228 may be configured to determine a position of the mobile device 200 based on one or more positioning techniques. For example, positioning unit 228 may be configured to determine a position of the mobile device 200 based on SPS measurements of SPS signals acquired with the aid of the time assistance data. The local database 230 may be configured to store and update one or more entries, where each entry identifies one or more cells of the operating environment 100 as well as an indication of whether time assistance data sent from the respective cell has been identified as valid or invalid. That is, local database 230 may include a first entry identifying base station transceiver 110a as well as a corresponding indication whether time assistance data received from base station transceiver 110a has been identified as valid or invalid, and a second entry identifying base station transceiver 110b and an indication whether time assistance data received from base station transceiver 110b has been identified as valid or invalid.

As will be discussed in more detail below, in operation, validation unit 226 may be configured to determine whether an entry corresponding to the current serving cell exists in local database 230 and if so, determine whether the entry indicates whether time assistance data received from the serving cell has been identified as valid or invalid. If the entry indicates that the time assistance data from this serving cell is valid, the mobile device 200 may proceed with initiating a GNSS session utilizing a GNSS time that is determined based on the time assistance data received from the serving cell. If however, the entry indicates that the time assistance data from this serving cell is invalid, the mobile device 200 may ignore the time assistance data and perform a cold start for the GNSS session.

Furthermore, if there is no entry corresponding to the current serving cell in the local database 230, the validation unit 226 may validate the received time assistance data itself. In some aspects, the mobile device 200 receives the time assistance data via a first wireless communication technology (e.g., LTE) as well as a reference GNSS time that is received via a second wireless communication technology (e.g., LTE, CDMA, GPS, etc.). For example, the validation unit 226 may be configured to validate the time assistance data received from an LTE serving cell against CDMA system time. This is possible in multi-mode mobile devices (e.g., devices that support SVLTE, SRLTE, CSFB) or 1x+LTE multi-SIM devices. In another example, the validation unit 226 may validate time assistance data received from an LTE serving cell against the LTE time assistance that is received from one or more neighbor cells. In yet another example, the validation unit 226 may validate time assistance data received from an LTE serving cell against a GNSS time that was determined during a previous GNSS session.

In one example, validation unit 226 may be implemented in hardware 216, firmware 218, processor 214 in combination with software 222, or any combination thereof. For a hardware implementation, the validation unit 226 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

Returning now to FIG. 2, control unit 210 may further include an application unit 232. The application unit 232 may be a process running on the processor 214 of the mobile device 200, which requests position information from the positioning unit 228. Applications typically run within an upper layer of the software architectures, and may include Indoor/Outdoor Navigation, Buddy Locator, Shopping and Coupons, Asset Tracking, and location Aware Service Discovery.

Processor 214, validation unit 226, positioning unit 228, and local database 230 are illustrated separately for clarity, but may be a single unit and/or implemented in the processor 214 based on instructions in the software 222 which is run in the processor 214. Processor 214, validation unit 226, positioning unit 228 can, but need not necessarily include, one or more microprocessors, embedded processors, controllers, application specific integrated circuits (ASICs), digital signal processors (DSPs), and the like. The term processor describes the functions implemented by the system rather than specific hardware. Moreover, as used herein the term "memory" refers to any type of computer storage medium, including long term, short term, or other memory associated with mobile device 200, and is not to be limited to any particular type of memory or number of memories, or type of media upon which memory is stored.

The processes described herein may be implemented by various means depending upon the application. For example, these processes may be implemented in hardware 216, firmware 218, processor 214 in combination with software 222, or any combination thereof. For a hardware implementation, the processor 214 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or processor/software implementation, the processes may be implemented with modules (e.g., procedures, functions, and so on) that perform the functions described herein. Any non-transitory computer-readable medium tangibly embodying instructions may be used in implementing the processes described herein. For example, program code may be stored in memory 220 and executed by the processor 214. Memory 220 may be implemented within or external to the processor 214.

If implemented in firmware 218 and/or processor 214 with software 222, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The mobile device 200 may include an optional user interface 212 which provides any suitable interface systems, such as a microphone/speaker 234, keypad 236, and display 238 that allows user interaction with the mobile device 200. The microphone/speaker 234 provides for voice communication services using the wireless transceiver 202. The keypad 236 comprises any suitable buttons for user input. The display 238 comprises any suitable display, such as, for example, a backlit LCD display, and may further include a touch screen display for additional user input modes.

Figure 3:
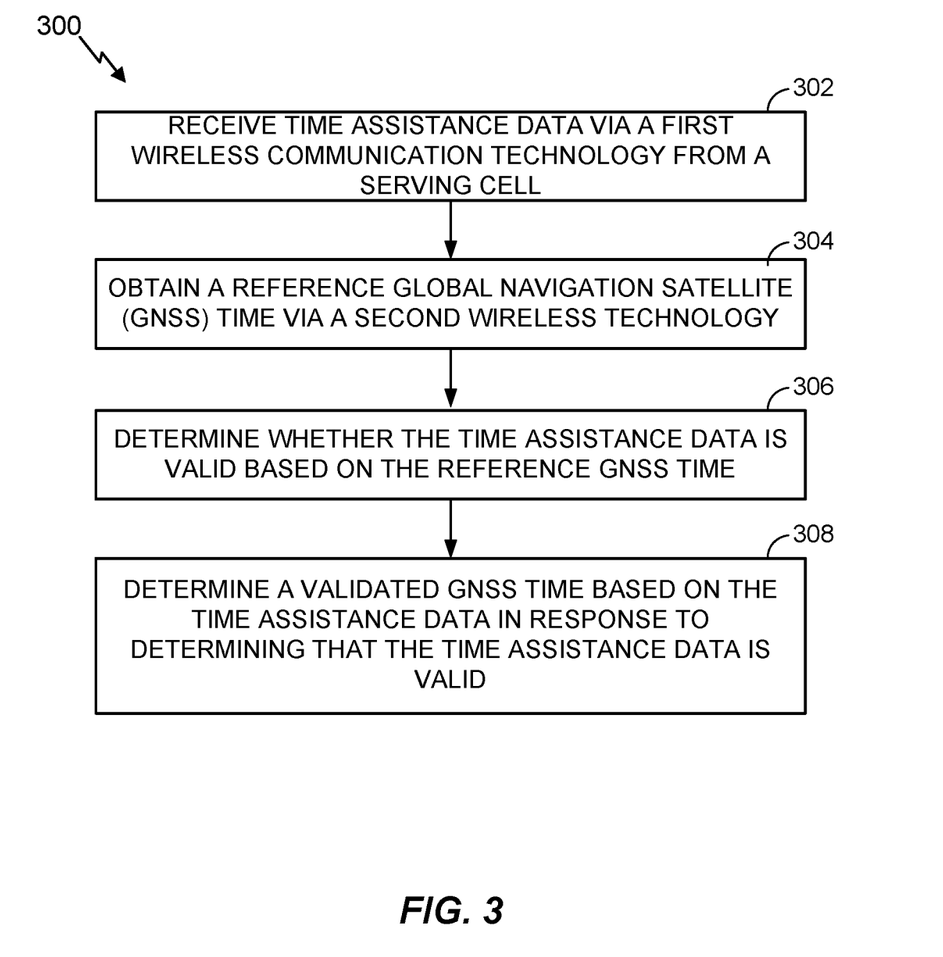
FIG. 3 illustrates an example process of validating time assistance data, according to one aspect of the disclosure.

FIG. 3 illustrates an example process 300 of validating time assistance data, according to one aspect of the disclosure. Process 300 may be performed by mobile device 108 of FIG. 1 and/or mobile device 200 of FIG. 2.

In a process block 302, a first wireless transceiver (e.g., wireless transceiver 202) receives time assistance data via a first wireless communication technology from a serving cell (e.g., base station transceiver 110a). In one example, the first wireless communication technology includes Long Term Evolution (LTE). In LTE, system information that includes a GPS time and/or UTC time may be broadcast by an eNB by way of one or more system information blocks (SIBs). In LTE, a variety of SIBs carry relevant information for the mobile device 200, which help the mobile device 200 perform a variety of functions, such as to access a cell, perform cell re-selection, etc. In one example, SIBs are transmitted by a cell on BCCH→DL-SCH→PDSCH. In one aspect, the mobile device 200 will initiate a SIB acquisition procedure to acquire one or more SIBs in response to a variety of situations, such as the powering on of the mobile device 200, cell re-selection, completion of a handover, etc.

In one example, the time assistance data is contained in SIB8 and/or SIB16 messages transmitted by the serving cell. The SIB8 message may include a variety of fields typically relevant for inter-RAT cell reselection, including information about CDMA frequencies and CDMA neighbor cells relevant for cell re-selection. However, one field included in the SIB8 message (commonly referred to as the systemTimeInfo field) includes information on the CDMA system time. As mentioned above, in CDMA, the system time is typically always in-sync with GPS time. Thus, a GNSS time (e.g., GPS time) may be derived directly from the CDMA system time indicated in the SIB8 message.

The SIB16 contains information specifically related to GPS time and coordinated universal time (UTC), such that the mobile device 200 may use these parameters provided in the SIB16 to obtain the UTC, GPS, and/or local time. The SIB16 message may include a variety of fields, such as a dayLightSavingTime field (indicates if and how daylight saving time is applied to obtain the local time), a leapSeconds field (number of leap seconds offset between GPS time and UTC), a localTimeOffset field (offset between UTC and local time in units of 15 minutes), and a timeInfoUTC field (Coordinated Universal Time corresponding to the SFN boundary at or immediately after the ending boundary of the SI-window in which SIB16 is transmitted. The timeInfoUTC field counts the number of UTC seconds in 10 ms units since 00:00:00 on Gregorian calendar date 1 Jan. 1900 (midnight between Sunday, Dec. 31, 1899 and Monday, Jan. 1, 1900). In one aspect, the mobile device 200 may use the timeInfoUTC field together with the leapSeconds field to obtain the GPS time as follows: GPS Time (in seconds) =timeInfoUTC (in seconds)−2,524,953,600 (seconds)+leapSeconds, where 2,524,953,600 is the number of seconds between 00:00:00 on Gregorian calendar date 1 Jan. 1900 and 00:00:00 on Gregorian calendar date 6 Jan. 1980 (start of GPS time).

Accordingly, process block 302 may include the first wireless transceiver receiving time assistance data by way of one or more SIB8 and/or SIB16 messages transmitted by the serving cell (e.g., base station transceiver 110a). In process block 304, the mobile device 200 obtains a reference GNSS time via a second wireless technology (e.g., LTE, CDMA, GPS, etc.). In one aspect, the reference GNSS time may be obtained by mobile device 200 communicating on a CDMA network to obtain the CDMA system time (e.g., base station transceiver 110b). As mentioned above, the mobile device 200 may be a multi-mode mobile device (e.g., device that support SVLTE, SRLTE, CSFB) or a 1x+LTE multi-SIM device to allow the mobile device 200 to communicate on an alternate wireless communication technology in addition to LTE. In another example, the reference GNSS time is received from one or more neighbor cells (e.g., by way of SIB8 and/or SIB16 messages transmitted by neighbor cell—base station transceiver 110b). In yet another example, the reference GNSS time may refer to a GNSS time that was determined by the mobile device 200 during a previous GNSS session.

Next, in process block 306, the validation unit 226 of mobile device 200 determines whether the time assistance data is valid based on the reference GNSS time. In one aspect, determining whether the time assistance is valid includes determining a candidate GNSS time based on the time assistance data and then comparing the candidate GNSS time with the reference GNSS time. Comparing the candidate GNSS time with the reference GNSS time at two instances may be performed, by the mobile device 200, as follows:

(i) determine the candidate GNSS time (in msec)=G1,
(ii) determine the reference GNSS time (in msec)=G2,
(iii) determine a candidate GNSS time uncertainty (in msec) =GTUNC1,
(iv) determine a reference GNSS time uncertainty (in msec) =GTUNC2,
(v) determine a value (X1) of the local XO clock counter (e.g., clock counter 209 of FIG. 2) associated with candidate GNSS time G1,
(vi) determine a value (X2) of the local XO clock counter associated with reference GNSS time G2, (vii) determine a drift rate, in ppm, of the local XO clock counter=XO_DIFF,
(viii) calculate a difference between candidate GNSS time and the reference GNSS time as G_DIFF (in msec)=G2−G1,
(ix) calculate a difference between time instances of the local XO clock counter as XO_DIFF (in msec)=(X2−X1)*1000/XO frequency,
(x) determine that the candidate GNSS time is comparable to the reference GNSS time if the difference in XO_DIFF and G_DIFF are less than the uncertainties:

$$|(G_{diff} - XO_{diff})| \leq G_{TUNC1} + G_{TUNC2} + (XO_{diff} * XO_{clock\ drift\ rate}). \quad \text{EQ. 1}$$

Thus, as shown above by EQ. 1, the time assistance data received from a serving cell may be determined to be valid if the difference between XO_DIFF and G_DIFF is less than a threshold associated with the uncertainties (i.e., GNSS time uncertainties and local XO clock counter drift rate). Conversely, if the difference between XO_DIFF and G_DIFF is greater than the threshold, then the time assistance data is determined to be invalid.

Returning now to FIG. 3, process 300 then continues to process block 308 where the mobile device 200 determines a validated GNSS time based on the time assistance data in response to determining that the time assistance data is valid (e.g., see EQ 1 above). In one aspect, the validated GNSS time is utilized as the basis for initiating a GNSS fix or for decoding GNSS time from a GNSS satellite vehicle based on a search window that is determined based on the time assistance data received from the serving cell. As will be discussed in more detail below, in some aspects, the mobile device 200 may maintain a local database 230, where local database 230 includes entries corresponding to one or more cells in the operating environment 100, and where each entry indicates whether time assistance data received from that cell has been identified as valid or invalid. In one aspect, the mobile device 200 may populate and update the local database 230 based on determinations made locally by the mobile device 200. In addition, the mobile device 200 may receive one or more entries for local database 230 from a server (e.g., server 140, 150, and/or 155 of FIG. 1) or from another mobile device. In yet another example, mobile device 200 may be configured to transmit one or more entries to another mobile device or to a server (e.g., server 140, 150, and/or 155 of FIG. 1) for the crowd-sourcing of time assistance data validation for several cells in a network. Thus, in some examples, one or more of servers 140, 150, and 155 may maintain a remote database that include entries identifying one or more cells and an indication of whether time assistance data sent from the respective cell has been identified as valid or invalid.

Figure 4:
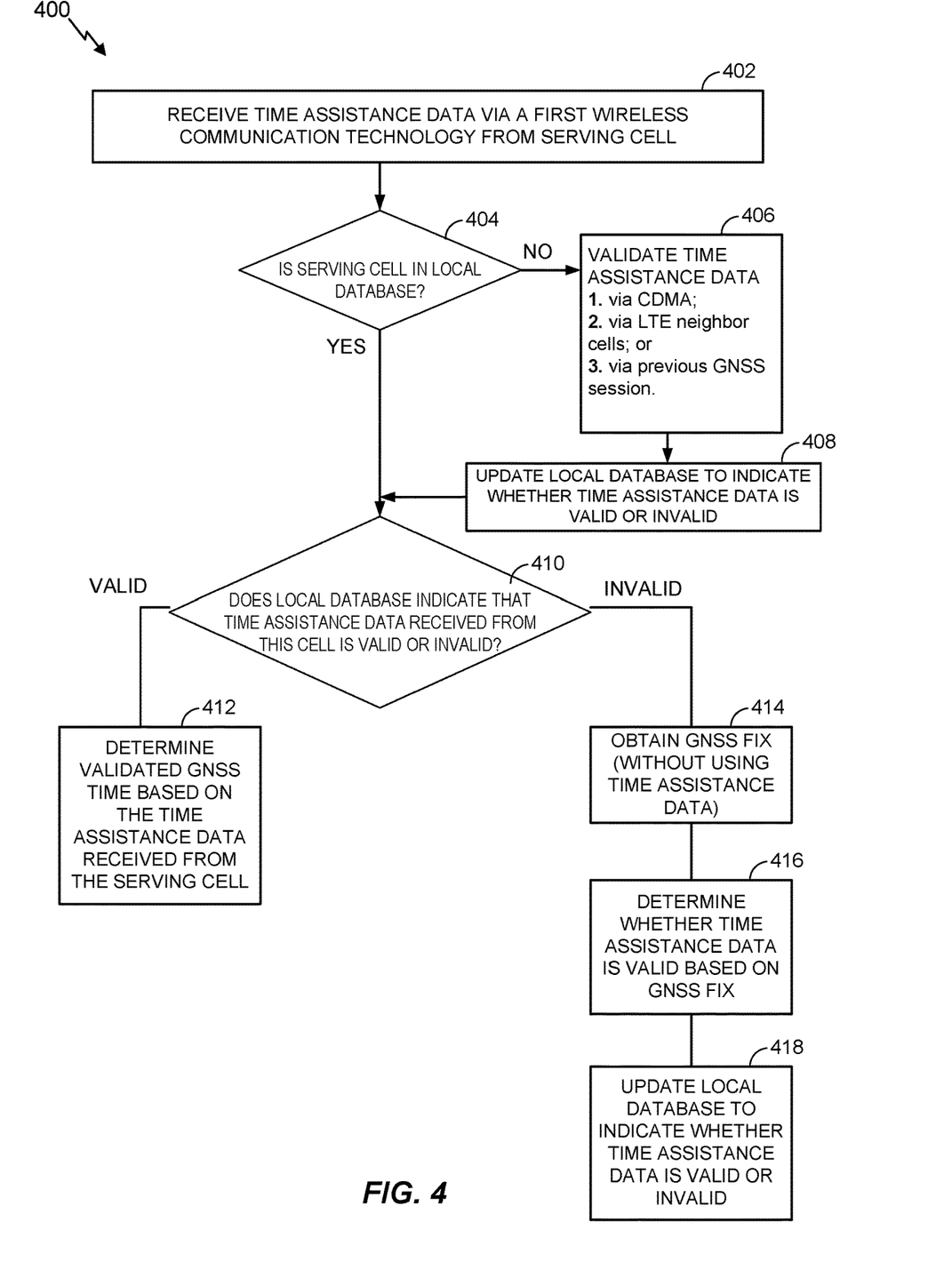
FIG. 4 illustrates an example process of validating time assistance data utilizing a local database, according to one aspect of the disclosure.

FIG. 4 illustrates an example process 400 of validating time assistance data utilizing a local database, according to one aspect of the disclosure. Process 400 may be performed by mobile device 108 of FIG. 1 and/or mobile device 200 of FIG. 2.

In process block 402, a first wireless transceiver (e.g., wireless transceiver 202) receives time assistance data via a first wireless communication technology from a serving cell (e.g., base station transceiver 110a). In one aspect, process block 402 corresponds to process block 302 of FIG. 3. Next, in process block 404, the validation unit 226 determines whether an entry corresponding to the serving cell (base station transceiver 110a) exists in the local database 230. If no entry exists for the serving cell in the local database 230, process 400 then performs the time assistance data validation procedure of process block 406. Thus, in one example, the time assistance data validation procedure of process block 406 is performed in response to there being no entry in local database 230 for the current serving cell. In some examples, the time assistance data validation procedure of process block 406 is only performed when no entry exists in the local database 230 for the current serving cell to reduce the processing burden, reduce signaling requirements, and/or to conserve power. However, in other examples, the validation procedure of process block 406 may be performed periodically for the serving cell regardless of whether an entry already exists for the serving cell in the local database 230. For example, if the entry in local database 230 exists, but it is stale (entry created too long ago), then the time assistance data validation procedure of process block 406 may still be performed to verify and/or update the local database 230.

In one aspect, the validation procedure of process block 406 corresponds to process blocks 304 and 306 discussed above with reference to FIG. 3. That is, process block 406 may include the mobile device 200 obtaining a reference GNSS time via a second wireless technology (e.g., LTE, CDMA, GPS, etc.) and determining whether the time assistance data is valid based on the reference GNSS time (e.g., see EQ. 1). Thus, in some aspects, the time assistance data received via LTE may be validated via CDMA, via one or more LTE neighbor cells, and/or via a previous GNSS session. In one example, validating via one or more LTE neighbor cells may include receiving SIB8 and/or SIB16 messages only from LTE neighbor cells that have themselves been validated (e.g., only use reference GNSS times obtained from cells that are identified in local database 230 as valid). In another example, validating via one or more LTE neighbor cells may include receiving SIB8 and/or SIB16 messages from multiple LTE neighbor cells regardless of whether the LTE neighbor cells have been validated provided the reference GNSS times obtained from the LTE neighbor cells closely agree with one another (e.g., within a threshold amount).

Next, in process block 408, the mobile device 200 then updates the local database 230 to include an entry indicating whether the time assistance data received from the serving cell is valid. As discussed above, the mobile device 200 may also transmit one or more entries of the local database 230 to server for the crowd-sourcing of time assistance data validation information. In one aspect, the mobile device 200 may be configured to upload the time assistance data periodically to the server. In another example, the mobile device 200 may be configured to upload the time assistance data each time an entry is created and/or updated.

Next, process 400 proceeds to decision block 410, where the validation unit 226 determines whether the entry associated with the serving cell indicates that time assistance data received from this cell is valid or invalid. If the entry for the serving cell indicates that the time assistance data is valid, the process block 412 includes determining a validated GNSS time based on the time assistance data received from the serving cell. In one aspect, process block 412 further includes initiating a GNSS session for the mobile device 200 and utilizing the validated GNSS time for acquiring the SPS signals for the GNSS session. However, aspects of the present disclosure do not require initiating a GNSS session each time the assistance data from a serving cell is validated. That is, in some examples, process 300 and/or process 400 may be performed as a background procedure without initiating an actual GNSS session. Thus, mobile device 200 may maintain and update local database 230 for future use and/or for the crowd-sourcing of such validation information for use by other devices.

Returning back to decision block 410, if the local database 230 indicates that the time assistance data is invalid, the process 400 proceeds to process 414 that includes initiating a GNSS session, where a GNSS fix is obtained without using the time assistance data that was received from the serving cell. That is, if the time assistance data is determined to be invalid, then mobile device 200 may ignore the time assistance data and perform a "cold start" for the GNSS session.

After obtaining the GNSS fix, optional process block 416 includes determining whether the time assistance data is valid or invalid based on the GNSS fix. That is, process block 416 includes verifying, after a successful cold start GNSS fix, whether the time assistance data was indeed invalid. In one aspect, determining whether the time assistance data is valid or invalid in process block 416 may include a similar process to that described above with reference to EQ. 1. For example, the candidate GNSS time may be determined based on the time assistance data and the reference GNSS time may be determined based on the GNSS fix of the GNSS session. As shown in process block 418, the local database 230 is then updated to indicate whether the time assistance data is valid or invalid.

Figure 5:
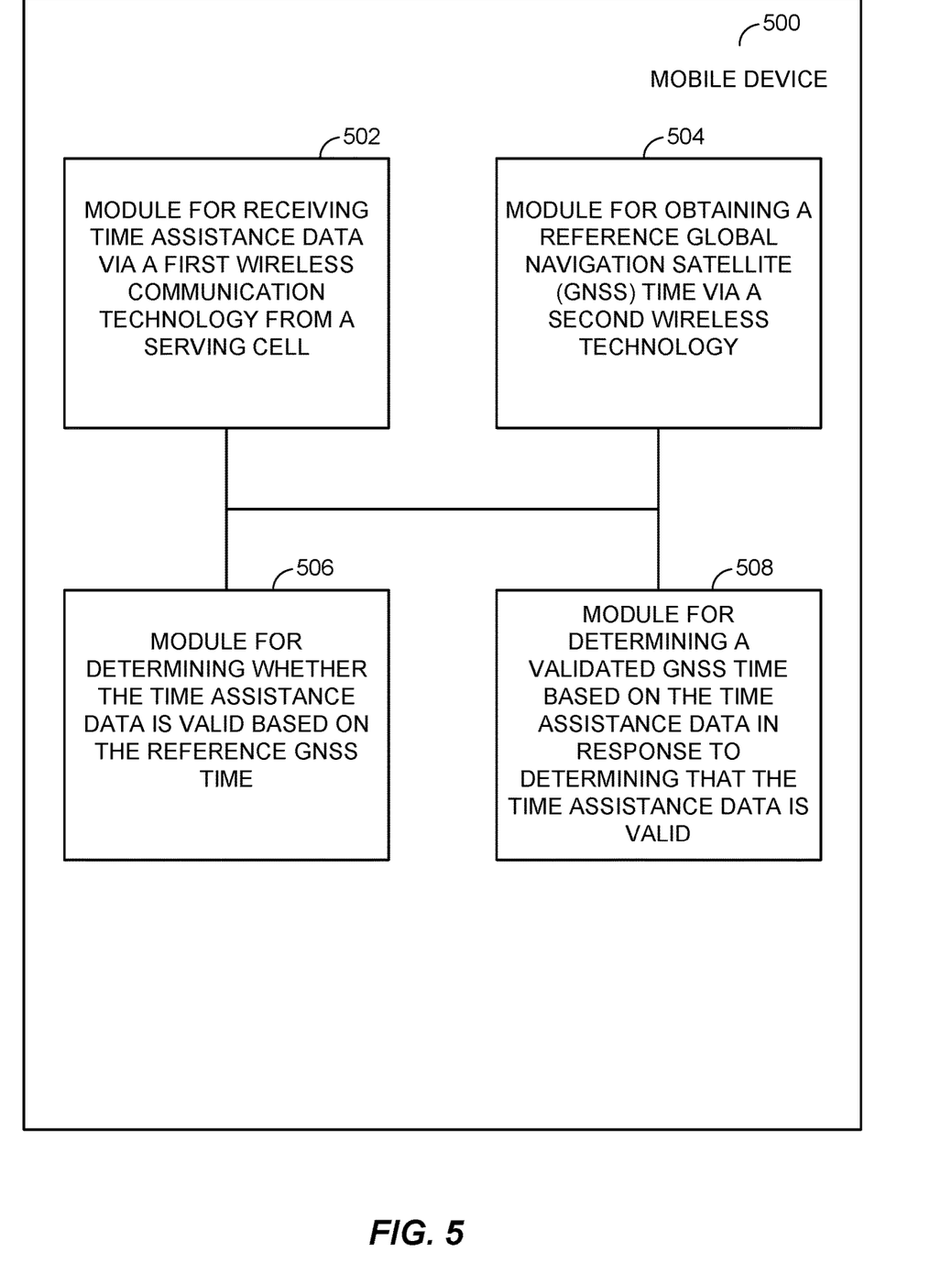
FIG. 5 illustrates several sample aspects of components that may be employed in a mobile device configured to support the validation of time assistance data, as taught herein.

FIG. 5 illustrates several sample aspects of components that may be employed in a mobile device 500 configured to support the validation of time assistance data, as taught herein. Mobile device 500 is one possible implementation of mobile device 108 of FIG. 1 and/or mobile device 200 of FIG. 2.

A module 502 for receiving time assistance data via a first wireless communication technology may correspond at least in some aspects to, for example, a wireless transceiver 202 of FIG. 2. A module 504 for obtaining a reference GNSS time via a second wireless technology may correspond at least in some aspects to, for example, wireless transceiver 202 and/or SPS transceiver 208 of FIG. 2. A module 506 for determining whether the time assistance data is valid may correspond at least in some aspects to, for example, validation unit 226 and/or processor 214, of FIG. 2. A module 508 for determining a validated GNSS time based on the time assistance data may correspond at least in some aspects to, for example, validation unit 226 and/or processor 214, of FIG. 2.

The functionality of the modules 502-508 of FIG. 5 may be implemented in various ways consistent with the teachings herein. In some designs, the functionality of these modules 502-508 may be implemented as one or more electrical components. In some designs, the functionality of these modules 502-508 may be implemented as a processing system including one or more processor components. In some designs, the functionality of these modules 502-508 may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 5, as well as other components and functions described herein, may be implemented using any suitable means. Such means also may be implemented, at least in part, using corresponding structure as taught herein. For example, the components described above in conjunction with the "module for" components of FIG. 5 also may correspond to similarly designated "means for" functionality. Thus, in some aspects, one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, just to name a few examples.

Further, those of skill in the art will appreciate that the various illustrative logical blocks, modules, circuits, and algorithm steps described in connection with the aspects disclosed herein may be implemented as electronic hardware and computer software. To clearly illustrate this interchangeability of certain portions of hardware and software, various illustrative components, blocks, modules, circuits, and steps have been described above generally in terms of their functionality. Whether such functionality is implemented as part of the hardware or software portion of an embodiment may depend upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may, by way of example, be embodied directly in hardware, firmware, or via one or more software modules in combination with such hardware and/or firmware. A software module may, by way of example, reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium.

Computer-readable media includes both computer storage media and communication media including any non-transitory medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other non-transitory medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method, comprising:
receiving, at a mobile device, time assistance data via a first wireless communication technology from a serving cell;
obtaining a reference global navigation satellite system (GNSS) time, at the mobile device, via a second wireless communication technology;
determining whether the time assistance data is valid based on the reference GNSS time;
determining a validated GNSS time based on the time assistance data in response to determining that the time assistance data is valid; and
maintaining, at the mobile device, a local database that includes one or more entries, each entry identifying a respective cell and an indication of whether time assistance data sent from the respective cell has been identified as valid or invalid.

2. The method of claim 1, further comprising:
determining whether an entry corresponding to the serving cell exits in the local database, wherein performing the determination as to whether the time assistance data is valid is in response to determining that no entry corresponding to the serving cell exists in the local database.

3. The method of claim 1, further comprising:
receiving, at the mobile device, one or more entries for the local database from a server.

4. The method of claim 1, further comprising:
updating the local database to include an entry indicating whether the time assistance data received from the serving cell is valid.

5. The method of claim 4, further comprising:
sending, from the mobile device to a server, an indication whether the time assistance data from the serving cell is valid.

6. The method of claim 1, further comprising:
initiating a GNSS session; and
utilizing the validated GNSS time that is determined based on the time assistance data for the GNSS session in response to the local database indicating that the time assistance data for the serving cell is valid.

7. The method of claim 6, further comprising:
ignoring the time assistance data and performing a cold start for the GNSS session in response to the local database indicating that the time assistance data for the serving cell has been identified as invalid.

8. The method of claim 1, wherein the time assistance data is included in a system information block (SIB) message received at the mobile device, and wherein the first wireless communication technology is long term evolution (LTE).

9. The method of claim 8, wherein the SIB message comprises a SIB8 message or a SIB16 message.

10. The method of claim 8, wherein the second wireless communication technology is code-division multiple access (CDMA), and wherein obtaining the reference GNSS time comprises determining the reference GNSS time based on a CDMA system time.

11. The method of claim 8, wherein the second wireless communication technology is LTE, and wherein obtaining the reference GNSS time comprises determining the reference GNSS time based on one or more SIB messages received at the mobile device from one or more neighbor cells.

12. The method of claim 8, wherein the second wireless communication technology is GNSS, and wherein obtaining the reference GNSS time comprises determining the reference GNSS time based on a prior GNSS session.

13. The method of claim 1, further comprising determining a candidate GNSS time based on the time assistance data, wherein determining whether the time assistance data is valid is based, at least, on (1) a difference between the reference GNSS time and the candidate GNSS time, and (2) a difference in time instances of a clock counter of the mobile device associated with the reference GNSS time and the candidate GNSS time.

14. The method of claim 13, further comprising:
determining that the time assistance data is valid if, $$|(G_{diff} - XO_{diff})| \leq G_{TUNC1} + G_{TUNC2} + (XO_{diff} * XO_{clock\ drift\ rate}),$$

where $G_{diff}$ is the difference between the reference GNSS time and the candidate GNSS time, $XO_{diff}$ is the difference in the time instances of the clock counter associated with the reference GNSS time and the candidate GNSS time, $G_{TUNC1}$ is a GNSS time uncertainty associated with the reference GNSS time, $G_{TUNC2}$ is a GNSS time uncertainty associated with the candidate GNSS time, and $XO_{clock\ drift\ rate}$ is a clock drift rate associated with the clock counter of the mobile device.

15. A mobile device, comprising:
a first transceiver configured to communicate via a first wireless communication technology;
a second transceiver configured to communicate via a second wireless communication technology;
at least one processor; and
at least one memory coupled to the at least one processor, the at least one processor and the at least one memory being configured to direct the mobile device to:
receive, at the first transceiver, time assistance data from a serving cell via the first wireless communication technology;
obtain a reference global navigation satellite system (GNSS) time, at the second transceiver, via the second wireless communication technology;

determine whether the time assistance data is valid based on the reference GNSS time;
determine a validated GNSS time based on the time assistance data in response to determining that the time assistance data is valid; and
maintain, at the mobile device, a local database that includes one or more entries, each entry identifying a respective cell and an indication of whether time assistance data sent from the respective cell has been identified as valid or invalid.

16. The mobile device of claim 15, wherein the at least one processor and the at least one memory are further configured to direct the mobile device to:
determine whether an entry corresponding to the serving cell exits in the local database, wherein performing the determination as to whether the time assistance data is valid is in response to determining that no entry corresponding to the serving cell exists in the local database.

17. The mobile device of claim 15, wherein the at least one processor and the at least one memory are further configured to direct the mobile device to:
initiate a GNSS session; and
utilize the validated GNSS time that is determined based on the time assistance data for the GNSS session in response to the local database indicating that the time assistance data for the serving cell is valid.

18. The mobile device of claim 17, wherein the at least one processor and the at least one memory are further configured to direct the mobile device to:
ignore the time assistance data and perform a cold start for the GNSS session in response to the local database indicating that the time assistance data for the serving cell has been identified as invalid.

19. The mobile device of claim 15, wherein the time assistance data is included in a system information block (SIB) message received at the first transceiver, and wherein the first wireless communication technology is long term evolution (LTE).

20. The mobile device of claim 19, wherein the second wireless communication technology is code-division multiple access (CDMA), and wherein the at least one processor and the at least one memory are further configured to direct the mobile device to determine the reference GNSS time based on a CDMA system time.

21. The mobile device of claim 19, wherein the second wireless communication technology is LTE, and wherein the at least one processor and the at least one memory are further configured to direct the mobile device to determine the reference GNSS time based on one or more SIB messages received at the mobile device from one or more neighbor cells.

22. The mobile device of claim 19, wherein the second wireless communication technology is GNSS, and wherein the at least one processor and the at least one memory are further configured to direct the mobile device to determine the reference GNSS time based on a prior GNSS session.

23. The mobile device of claim 15, wherein the at least one processor and the at least one memory are further configured to direct the mobile device to determine a candidate GNSS time based on the time assistance data, wherein determining whether the time assistance data is valid is based, at least, on (1) a difference between the reference GNSS time and the candidate GNSS time, and (2) a difference in time instances of a clock counter of the mobile device associated with the reference GNSS time and the candidate GNSS time.

24. The mobile device of claim 23, wherein the at least one processor and the at least one memory are further configured to direct the mobile device to:
determining that the time assistance data is valid if, $$|(G_{diff} - XO_{diff})| \leq G_{TUNC1} + G_{TUNC2} + (XO_{diff} * XO_{clock\ drift\ rate}),$$

where $G_{diff}$ is the difference between the reference GNSS time and the candidate GNSS time, $XO_{diff}$ is the difference in the time instances of the clock counter associated with the reference GNSS time and the candidate GNSS time, $G_{TUNC1}$ is a GNSS time uncertainty associated with the reference GNSS time, $G_{TUNC2}$ is a GNSS time uncertainty associated with the candidate GNSS time, and $XO_{clock\ drift\ rate}$ is a clock drift rate associated with the clock counter of the mobile device.

25. A mobile device, comprising:
means for receiving, at the mobile device, time assistance data via a first wireless communication technology from a serving cell;
means for obtaining a reference global navigation satellite system (GNSS) time, at the mobile device, via a second wireless communication technology;
means for determining whether the time assistance data is valid based on the reference GNSS time
means for determining a validated GNSS time based on the time assistance data in response to determining that the time assistance data is valid; and
means for maintaining, at the mobile device, a local database that includes one or more entries, each entry identifying a respective cell and an indication of whether time assistance data sent from the respective cell has been identified as valid or invalid.

26. The mobile device of claim 25,
means for determining whether an entry corresponding to the serving cell exits in the local database, wherein the means for determining whether the time assistance data is valid is in response to determining that no entry corresponding to the serving cell exists in the local database; and
means for updating the local database to include an entry indicating whether the time assistance data received from the serving cell is valid.

27. A non-transitory computer-readable medium including program code stored thereon, wherein the program code includes instructions, which when executed by a processor of a mobile device, direct the mobile device to:
receive, at the mobile device, time assistance data from a serving cell via a first wireless communication technology;
obtain a reference global navigation satellite system (GNSS) time, at the mobile device, via a second wireless communication technology;
determine whether the time assistance data is valid based on the reference GNSS time
determine a validated GNSS time based on the time assistance data in response to determining that the time assistance data is valid; and
maintain, at the mobile device, a local database that includes one or more entries, each entry identifying a respective cell and an indication of whether time assistance data sent from the respective cell has been identified as valid or invalid.

28. The non-transitory computer-readable medium of claim 27, wherein the program code further comprises instructions to direct the mobile device to:

determine whether an entry corresponding to the serving cell exits in the local database, wherein instructions to perform the determination as to whether the time assistance data is valid is in response to determining that no entry corresponding to the serving cell exists in the local database; and update the local database to include an entry indicating whether the time assistance data received from the serving cell is valid.

\* \* \* \* \*